Aug. 16, 1960            J. LOVELL            2,949,091

HATCH COVER MECHANISM

Filed Oct. 2, 1958                               2 Sheets-Sheet 1

INVENTOR.
JACK LOVELL

BY

ATTORNEY

Aug. 16, 1960    J. LOVELL    2,949,091
HATCH COVER MECHANISM
Filed Oct. 2, 1958    2 Sheets-Sheet 2

INVENTOR.
JACK LOVELL
BY
*ATTORNEY*

United States Patent Office 2,949,091
Patented Aug. 16, 1960

2,949,091

HATCH COVER MECHANISM

Jack Lovell, Chagrin Falls, Ohio, assignor to Cleveland Pneumatic Industries, Inc., Cleveland, Ohio, a corporation of Ohio Filed Oct. 2, 1958, Ser. No. 764,893

8 Claims. (Cl. 114—202)

This invention relates to a new and improved power operated hatch cover system adapted to cover hatchways of ships and the like.

It is an important object of this invention to provide a new and improved folding hatch cover system.

It is another important object of this invention to provide a jacking and rolling system for hatch covers which is stable in operation and simple in structure.

It is still another object of this invention to provide a truck for folding hatch covers incorporating means to jack the hatch covers prior to their opening to release the fluid seal and provide a stable rolling system to support the hatch cover while it is operating.

Further objects and advantages will appear from the following description and drawings, wherein.

In many cases, hatch covers for ships' hatchways require the use of four or more pontoons or panels which extend in a parallel relationship when they cover the hatchway and are movable to a folded position at one or both ends of the hatchway depending upon the particular design requirements. If more than four panels are used to cover a hatchway, at least four of the panels are folded to one end of the hatchway or in some cases where there are only four panels covering the hatchway, the stowage conditions adjacent to the hatchway require that all of the panels be folded to one end. This invention is particularly well adapted for use where four or more panels must be folded to one end of the hatchway whether or not there are four or more panels in the total hatch cover system.

Figure 1:
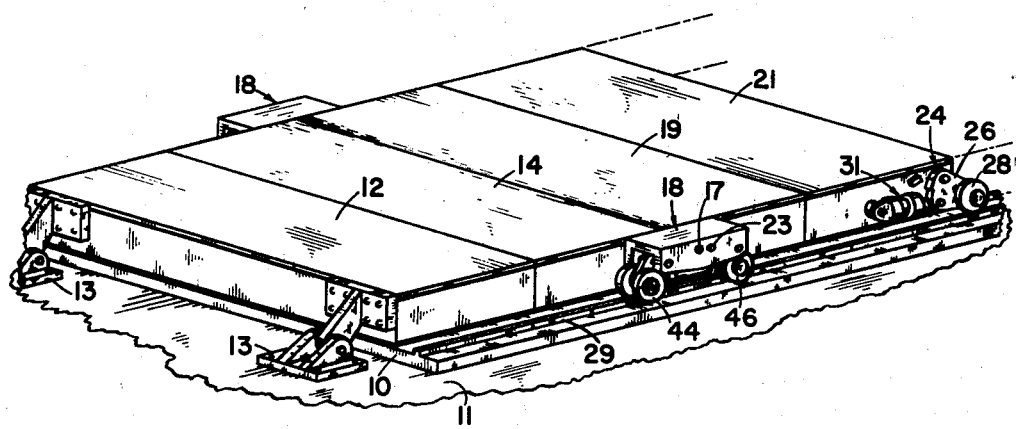
Figure 1 is a perspective view of the typical hatch cover incorporating this invention.

In Figure 1, a hatchway is shown schematically which includes a coaming 10 around a hatchway on the deck 11 of a ship. A first panel 12 is connected adjacent to one end of the hatchway by a pair of hinges 13 and pivotally connected by a hinge 16 along its opposite edge to a second panel 14. The hinge 16 between the panels 12 and 14 only appears in Figure 3 because the hinges are below the surface of the panel when the hatch cover is closed. The opposite edge of the panel 14 is in turn pivotally connected by a pivot 17 to a truck assembly 18 on either side of the hatch cover. Third and fourth panels 19 and 21 are pivotally connected together at their adjacent edges by a hinge 22 shown in Figure 3. The opposite edge of the third panel 19 is pivotally connected to the trucks 18 by a pivot 23 and the opposite edge of the fourth panel 21 is provided with a jacking assembly 24 on either side of the hatch cover. Only one of the truck assemblies 18 and jacking assemblies 24 appear in the drawings but it should be understood that similar assemblies are provided on the far side of the hatch cover which has a structure identical with the one illustrated in the drawings.

The four panels of the hatch cover are provided with a power actuating system of the type disclosed in the co-pending application of Joseph E. Hannigan, Serial No. 704,748, filed December 23, 1957, now Patent No. 2,906,326, which actuating systems have not been shown but operate to move the panels from the closed position of Figure 2 to the folded or open position of Figure 3. For a detailed description of this actuating system, reference should be made to the aforesaid co-pending application.

Figure 2:
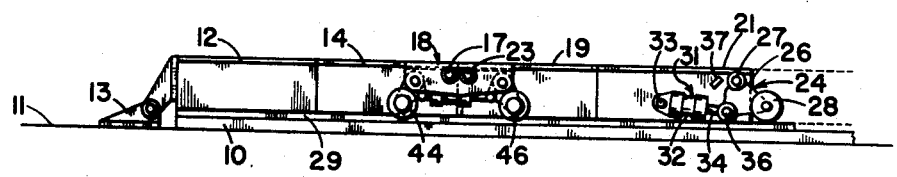
Figure 2 is a side elevation showing the hatch cover in the closed position.

When the hatch cover is in the closed position of Figure 2, the panels rest on the coaming 10 and are not supported by the jacking assemblies 24 or the truck assemblies 18. Prior to the opening of the hatch cover, the jacking assemblies 24 and the truck assemblies 18 are operated to raise the panels off the coaming 10 and thereafter the actuating mechanism is operated to cause the panels to fold to one end of the coaming 10. Conversely, when the hatch cover is closed, the assemblies remain in the jacked position until after the cover is extended.

Each of the jacking assemblies 24 include a jacking link 26 pivoted adjacent to the outer end of the fourth panel 21 for rotation around a pivot axis 27. A roller 28 is journalled on the outer end of the jacking link 26 and engages a track 29 extending along the coaming 10. To provide the power operation of the jacking assembly, a fluid motor 31 is provided which includes a cylinder 32 pivoted at 33 to the fourth panel 21 and a piston 34 pivoted to the jacking link 26 at 36. The motor 31 is operable, under the influence of fluid pressure, to rotate the jacking link 26 around the pivot axis 27 from the unjacked position of Figure 2 in a counterclockwise direction until the jacking link 26 engages a stop 37 on the fourth panel 21. When the jacking link 26 engages the stop 37, it is in the jacked position and the fourth panel 21 is supported on the rollers 28 of the jacking assembly 24. It is apparent that rotation of the link to the jacked position lowers the rollers 28 relative to the fourth panel 21 and raises the fourth panel 21 away from the coaming 10.

Figure 4:
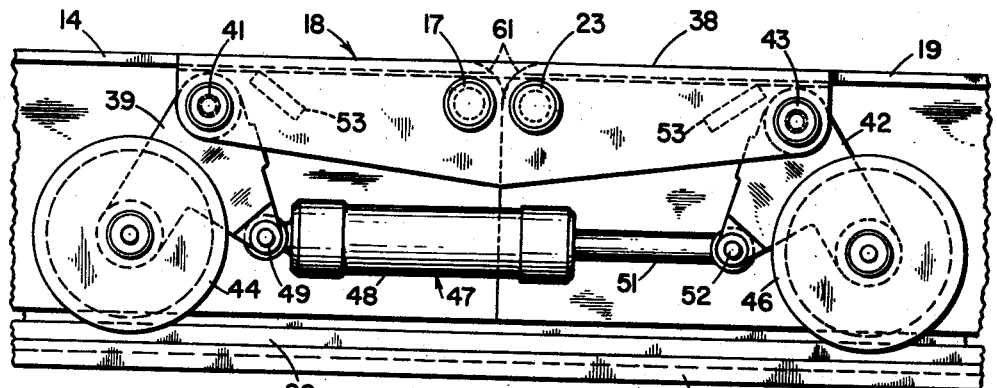
Figure 4 is an enlarged fragmentary view of the hatch cover truck in the unjacked position.
Figure 5:
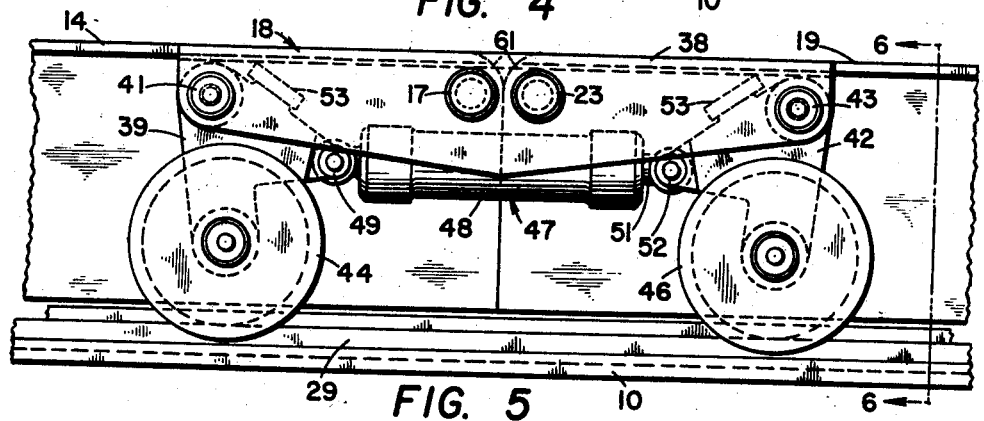
Figure 5 is a view similar to Figure 4 showing the truck elements in the jacked position.
Figure 6:
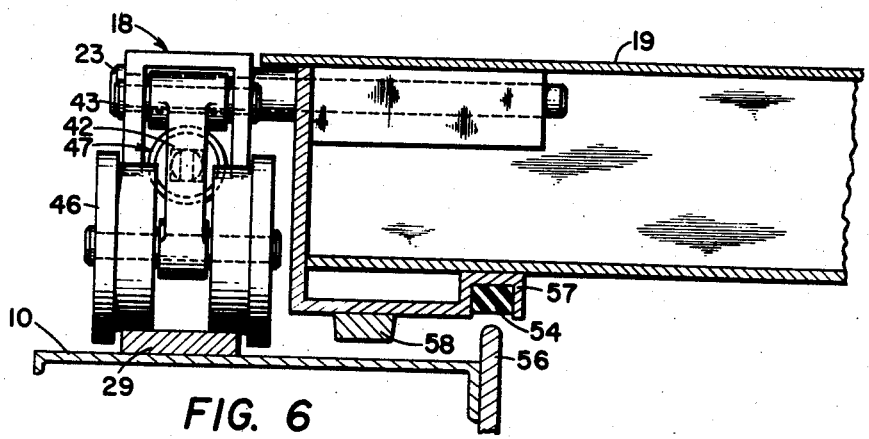
Figure 6 is a cross section taken along 6—6 of Figure 5.

Referring to Figures 4 through 6, the truck assembly 18 includes a hinge link 38 through which project the pivots 17 and 23 of the panels 14 and 19 respectively. A jacking arm 39 is pivoted at 41 to the left end of the hinge link 38 and a similar and opposite jacking arm 42 is pivoted at 43 to the hinge link 38. Preferably, the hinge link 38 is formed with a U-shaped cross section illustrated in Figure 5 and the jacking arms 39 and 42 are positioned between the sides of the U section.

A pair of rollers 44 and 46 are journalled on the lower end of the jacking arms 39 and 42 respectively and are proportioned so that both pairs of rollers 44 and 46 engage the track 29. A double acting fluid motor 47 is provided with a cylinder 48 pivotally connected to the jacking arm 39 by a pivot 49 and a piston 51 pivotally connected to the jacking arm 42 by a pivot 52. The cylinder 48 and piston 51 are axially movable relative to each other under the influence of fluid under pressure and provide the power to move the jacking arms 39 and 42 from the unjacked position of Figure 4 to the jacked position shown in Figure 5.

When the two jacking arms 39 and 42 are in the unjacked position of 49, the fluid motor 47 is in the extended position and the engagement of the rollers 44 and 46 with the track 29 is, in each case, horizontally spaced to the outside of the associated pivots 41 and 43. The jacking operation of the fluid motor 47 pulls the pivots 49 and 52 toward each other and operates to rotate the jacking arm 39 in a counterclockwise direction around its pivot 41 and rotates the jacking arm 42 in a clockwise direction around its pivot 43 until the jacking arms 39 and 42 engage stops 53 supported on the hinge link 38. This rotation to the jacked position of Figure 5 causes the hinge link 38 and in turn the second and third panels 14 and 19 to be raised and at the same time causes the engagement between the rollers 44 and 46 and the track 29 to pass under their associated pivots 41 and 43 to a point where the engagement of the rollers is horizontally spaced inwardly from their associated pivots. Therefore, the weight of the panels 14 and 19 produces a reaction tending to urge each of the jacking arms 39 and 42 into engagement with the stops 53 and maintains the jacking arms 39 and 42 in the jacked position of Figure 5. If the fluid motor is operated in the opposite direction, the elements return to the unjacked position of Figure 4.

The purpose of the jacking is to raise the panels away from the coaming 10 and break a resilient seal 54 away from a projection 56 on the coaming 10 as shown in Figure 6. In the illustrated case, the seal 54 is mounted in a channel 57 extending along the panels and is proportioned to engage the projection 56 when the panels are supported directly on the coaming 10. To prevent overcompression of the seal 54, rigid blocks 58 are mounted on the panels to engage the coaming 10 and support the panels when the seal 54 is compressed the desired amount. However, when the truck assembly 18 and the jacking assembly 24 are operated to lift the panels, the seal 54 is spaced from the projection 24 and the blocks 58 are spaced from the coaming 10 so that the panels are completely supported on the track 29 and hinges 13 when the panels are opened or closed. The hinges 16 and 22 are arranged so that the pairs of panels cannot rotate relative to each other beyond the parallel aligned position so each pair of panels can be supported at the opposite edges and the edges adjacent to the hinges 16 and 22 will be clear of the coaming 10 when the hatch cover is jacked.

In order to provide the folding action required, it is necessary to position the hinges 16 and 22 adjacent to the bottom faces of the panels and pivotally connect the second and third panels 14 and 19 adjacent to their top face. Therefore, the pivots 17 and 23 are arranged adjacent to the top faces of the second and third panels 14 and 19 respectively. To prevent interference between the panels 14 and 19 as they fold, the adjacent upper corners are recessed at 61.

Figure 3:
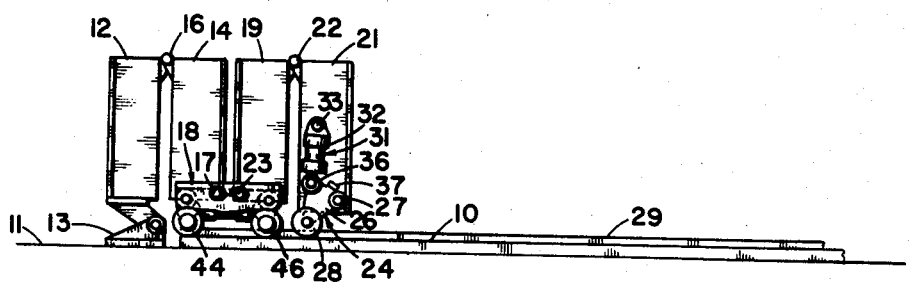
Figure 3 is a view similar to Figure 2 showing the hatch cover in the open position.

By utilizing a truck assembly of the type disclosed, it is possible to provide proper jacking of the panels and also insure a smooth stable operation as the panels are moved to the open position of Figure 3. It is apparent that as the panels move to the open position, the rollers 44 and 46 roll along the track 29 but since there are spaced rollers supporting the truck assemblies 18, they provide a firm and steady support for the panels during the opening or closing. Also, since the rollers 28 of the jacking assemblies 24 are in effect fixed to the fourth panel 21, movement of the panels to the open position causes the rollers 38 to roll along the track 29 in a stable manner. It should be noted that the fluid under pressure must be maintained on the fluid motor 31 of the jacking assemblies 24 during the opening operation until the point of contact of the rollers 28 on the track 29 passes under the pivot axes 27 at which time the weight of the fourth panel 21 operates to maintain the jacking links 26 in engagement with their associated stops 37.

It should be understood that if the hatch cover system includes more than four panels, the remaining panels can fold to the other end of the hatchway and the outboard jacking assemblies of the other panels must be proportioned to pass the jacking assemblies 24 when the panels are in the closed position. If six panels are to be folded to one end of the hatchway, an additional pair of trucks of the same structure as the trucks 18 would be used at the joint between the second and third pair of panels. Therefore, the invention should not be limited to a panel arrangement with only four panels folding to one end of the hatchway.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. In a hatchway cover having a plurality of panels and a track along the edge of the hatchway, a truck comprising a hinge link adapted to be pivotally connected to adjacent edges of adjacent panels, a pair of similar opposed jacking arms each pivoted on said hinge link, a roller on each arm movable along said track, said arms being rotatable from an unjacked position wherein each roller is horizontally spaced to one side of its arm pivot and to a jacked position wherein each roller is horizontally spaced on the other side of its arm pivot, a fluid motor having a piston pivotally connected to one of said arms and a cylinder pivotally connected to the other of said arms, said piston and cylinder being axially movable relative to each other to operate said arms between said jacked and unjacked positions and changing the vertical spacing between said hinge link and track.

2. In a hatchway cover having a plurality of panels and a track along the edge of the hatchway, a truck comprising a hinge link adapted to be pivotally connected to adjacent edges of adjacent panels, a pair of similar opposed jacking arms each pivoted on said hinge link, a roller on each arm movable along said track, said arms being rotatable from an unjacked position wherein each roller is horizontally spaced to one side of its arm pivot to a jacked position wherein each roller is horizontally spaced on the other side of its arm pivot, stops on said hinge link engaging said arm preventing rotation of each arm beyond said jacked position in a direction away from said unjacked position, a fluid motor having a piston pivotally connected to one of said arms and a cylinder pivotally connected to the other of said arms, said piston and cylinder being axially movable relative to each other to operate said arms between said jacked and unjacked positions and changing the vertical spacing between said hinge link and track.

3. A cover for a hatchway comprising a track on one side of said hatchway, a second track on the opposite side of said hatchway, a first pair of panels pivoted together along adjacent edges, a pivot connecting the opposite edge of one of said panels to one side of said hatchway, a second pair of panels pivoted together along adjacent edges, a wheel on each of said tracks connected to the opposite edge of one panel of said second pair, a jacking assembly co-operating with each of said tracks, each jacking assembly including a hinge link, a pivot connecting said hinge link to the opposite edge of the other panel of said first pair, a pivot connecting the opposite edge of the other panel of said second pair to said hinge link, a pair of rollers on said track connected at spaced points to said hinge link, and a jacking motor operably connected to said rollers operable to change the vertical spacing between said rollers and hinge link moving said hinge link between a jacked position wherein said hinge link supports the associated panels and an unjacked position wherein said associated panels are adapted to rest directly on the edges of said hatchway.

4. A cover for a hatchway comprising a track on one side of said hatchway, a second track on the opposite side of said hatchway, a plurality of sets of panels, each set having opposite end edges and including several panels mounted in side by side relationship, pivotal connecting means between the adjacent edges of the panels of each set, pivot means connecting one end edge of one of said sets to one side of said hatchway, a wheel on each of said tracks mounted adjacent to one end edge of another of said sets, a jacking assembly co-operating with each of said tracks, each jacking assembly including a hinge link, pivot means connecting the other end edges of said sets to said link, a pair of rollers on said track connected at spaced points to said hinge link, and a jacking motor operatively connected to said rollers operable to change the vertical spacing between said rollers and said hinge link thereby moving said hinge link relative to said track between a jacked position wherein said hinge link supports the associated panels and an unjacked position wherein said associated panels are adapted to rest directly on the edges of said hatchway.

5. A cover for a hatchway comprising a track on one side of said hatchway, a second track on the opposite side of said hatchway, a plurality of sets of panels, each set having opposite end edges and including several panels mounted in side by side relationship, pivotal connecting means between the adjacent edges of the panels of each set, pivot means connecting one end edge of one of said sets to one side of said hatchway, a wheel on each of said tracks mounted adjacent to one end edge of another of said sets, a jacking assembly co-operating with each of said tracks, each jacking assembly including a hinge link, pivot means connecting the other end edges of said sets to said link, a pair of rollers on said track connected at spaced points to said hinge link, a first jacking motor means operatively connected to said rollers operable to change the vertical spacing between said rollers and said hinge link thereby moving said hinge link relative to said track between a jacked position wherein said hinge link supports the associated panels and an unjacked position wherein said associated panels are adapted to rest directly on the edges of said hatchway, and second jacking motor means operably connected to each wheel operable to move said wheels between a jacked position wherein said wheels support their associated panels and an unjacked position wherein the associated panels are supported directly on the edge of said hatchway.

6. A hatchway cover as set forth in claim 5 including seal means between said panels and the edge of said hatchway providing a fluid tight seal therebetween only when said panels are supported directly on the edge of said hatchway.

7. A cover for a hatchway comprising a track on one side of said hatchway, a second track on the opposite side of said hatchway, a plurality of sets of panels, each set having opposite end edges and including several panels mounted in side by side relationship, pivotal connecting means between the adjacent edges of the panels of each set, pivot means connecting one end edge of one of said sets to one side of said hatchway, a wheel on each of said tracks mounted adjacent to one end edge of another of said sets, a jacking assembly co-operating with each of said tracks, each jacking assembly including a hinge link, pivot means connecting the other end edge of said sets to said link, a pair of similar and opposite jacking arms pivoted on said hinge link each provided with a roller movable along said track, and a jacking motor operatively connected between said arms operable to change the vertical spacing between said rollers and said hinge link thereby moving said hinge link relative to said track between a jacked position wherein said hinge link supports the associated panels and an unjacked position wherein said associated panels are adapted to rest directly on the edges of said hatchway.

8. A cover for a hatchway comprising a track on one side of said hatchway, a second track on the opposite side of said hatchway, a plurality of sets of panels, each set having opposite end edges and including several panels mounted in side by side relationship, pivotal connecting means between the adjacent edges of the panels of each set, pivot means connecting one end edge of one of said sets to one side of said hatchway, a wheel on each of said tracks mounted adjacent to one end edge of another of said sets, a jacking assembly co-operating with each of said tracks, each jacking assembly including a hinge link, pivot means connecting the other end edges of said sets to said link, a pair of similar and opposite jacking arms pivoted on said hinge link each provided with a roller movable along said track, a first jacking motor means operatively connected between said arms operable to change the vertical spacing between said rollers and said hinge link thereby moving said hinge link relative to said track between a jacked position wherein said hinge link supports the associated panels and an unjacked position wherein said associated panels are adapted to rest directly on the edges of said hatchway, and second jacking motor means operably connected to each wheel operable to move said wheels between a jacked position wherein said wheels support their associated panels and an unjacked position wherein the associated panels are supported directly on the edge of said hatchway.

No references cited.